US010259394B2

(12) United States Patent
Goldwitz

(10) Patent No.: US 10,259,394 B2
(45) Date of Patent: Apr. 16, 2019

(54) DEVICES AND METHODS FOR SECURING AN AREA IN A VEHICLE, METHODS OF MAKING DEVICES FOR SECURING AN AREA IN A VEHICLE, AND VEHICLES WITH A DEVICE FOR SECURING AN AREA

(71) Applicant: Brian Goldwitz, New Haven, CT (US)

(72) Inventor: Brian Goldwitz, New Haven, CT (US)

(*) Notice: Subject to any disclaimer, the term of this patent is extended or adjusted under 35 U.S.C. 154(b) by 0 days.

(21) Appl. No.: 15/724,522

(22) Filed: Oct. 4, 2017

(65) Prior Publication Data

US 2018/0134223 A1 May 17, 2018

Related U.S. Application Data

(60) Provisional application No. 62/423,765, filed on Nov. 17, 2016.

(51) Int. Cl.
*B60R 5/04* (2006.01)
(52) U.S. Cl.
CPC .................................. *B60R 5/045* (2013.01)
(58) Field of Classification Search
CPC ..................................................... B60R 5/045
USPC ............................................ 296/37.6, 37.16
See application file for complete search history.

(56) References Cited

U.S. PATENT DOCUMENTS

| 4,749,226 A * | 6/1988 | Heft ................... B62D 33/0273 |
| | | 296/37.6 |
| 5,324,089 A * | 6/1994 | Schlachter ................ B60R 5/04 |
| | | 292/DIG. 43 |
| 6,065,794 A * | 5/2000 | Schlachter ................ B60R 5/04 |
| | | 296/37.16 |
| 6,257,640 B1 * | 7/2001 | Leitner ..................... B60R 9/00 |
| | | 224/404 |
| 6,536,826 B1 * | 3/2003 | Reed ......................... B60P 3/42 |
| | | 224/404 |
| 2015/0035309 A1 | 2/2015 | Clark |

* cited by examiner

*Primary Examiner* — Joseph D. Pape
(74) *Attorney, Agent, or Firm* — Loza & Loza, LLP; Julio M. Loza

(57) ABSTRACT

Security devices include a side panel movably coupled to an attachment mechanism and to a top panel. At least one extension structure may be configured to adjust laterally inward and outward relative to the top panel. A locking mechanism may be positioned to lock the at least one extension structure from being adjusted laterally when in the secured position. The side panel is positioned at least substantially transverse to the top panel with the at least one extension structure extending laterally outward from the top panel when in a secured position, and at least substantially parallel to the top panel with the at least one extension structure positioned laterally inward when in a storage position. Other aspects, embodiments, and features are also included.

19 Claims, 11 Drawing Sheets

DEVICES AND METHODS FOR SECURING AN AREA IN A VEHICLE, METHODS OF MAKING DEVICES FOR SECURING AN AREA IN A VEHICLE, AND VEHICLES WITH A DEVICE FOR SECURING AN AREA

PRIORITY CLAIM

The present Application for Patent claims priority to Provisional Application No. 62/423,765 entitled "Devices and Methods for Securing Items and Space in a Back of a Vehicle like a Jeep" filed Nov. 17, 2016, the entire disclosure of which is incorporated by reference herein.

TECHNICAL FIELD

The technology discussed below relates generally to automotive features, and more specifically to devices for securing areas of a vehicle that are typically open to passersby.

BACKGROUND

JEEP is a brand of American automobiles that makes sport utility vehicles and off-road vehicles. Some models of vehicles produced under the JEEP brand include option to use an open interior configuration where the interior of the vehicle is generally open to the surrounding environment. This can create problems for securely leaving items inside the vehicle when it is unattended.

Accordingly, it may be desirable to provide devices and methods for securing an area in such vehicles from passersby. Such area can be utilized to leave items that may be easily stolen if left within unsecured areas of the vehicle.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate the securing of an area within a vehicle. At least one aspect of the present disclosure includes security devices for securing an area within a vehicle. According to at least one embodiment, a security device may include an attachment mechanism sized and shaped to be coupled to a portion of a vehicle. A side panel may be movably coupled to the attachment mechanism along a first adjoining edge, and a top panel may be movably coupled to the side panel along a second adjoining edge. At least one extension structure may be positioned to be adjusted laterally inward and outward relative to the top panel, and a locking mechanism may be positioned to lock the at least one extension structure from being laterally adjusted when the at least one extension structure is in a secured position.

Additional embodiments of a security device may include a top panel and a side panel hingedly coupled to the top panel. A first extension structure and a second extension structure may be movably coupled to the top panel to be adjusted laterally inward and outward relative to the top panel. The side panel may be positioned at least substantially transverse to the top panel, and the first extension structure and the second extension structure may each extend laterally outward from the top panel in a secured position. Further, the side panel may be positioned at least substantially parallel to the top panel, and the first extension structure and the second extension structure may each be positioned laterally inward relative to the top panel and adjacent the top panel in a storage position.

Further aspects of the present disclosure include vehicles including a security device. According to one or more embodiments, a vehicle according to the present disclosure may include a trunk space with a floor surface. A side panel may be positioned within the trunk space and hingedly coupled to a portion of the trunk space. At least one extension structure may be configured to be adjusted laterally inward and outward relative to the top panel. In a secured position, the side panel may be positioned at least substantially transverse to the top panel and to the floor surface. In a storage position, the side panel may be positioned at least substantially parallel to the top panel and to the floor surface.

Other aspects, features, and embodiments associated with the present disclosure will become apparent to those of ordinary skill in the art upon reviewing the following description in conjunction with the accompanying figures.

DRAWINGS

DETAILED DESCRIPTION

The illustrations presented herein are, in some instances, not actual views of any particular security device or vehicle, but are merely idealized representations which are employed to describe one or more aspects of the present disclosure. Additionally, elements common between figures may retain the same numerical designation.

Figure 1:
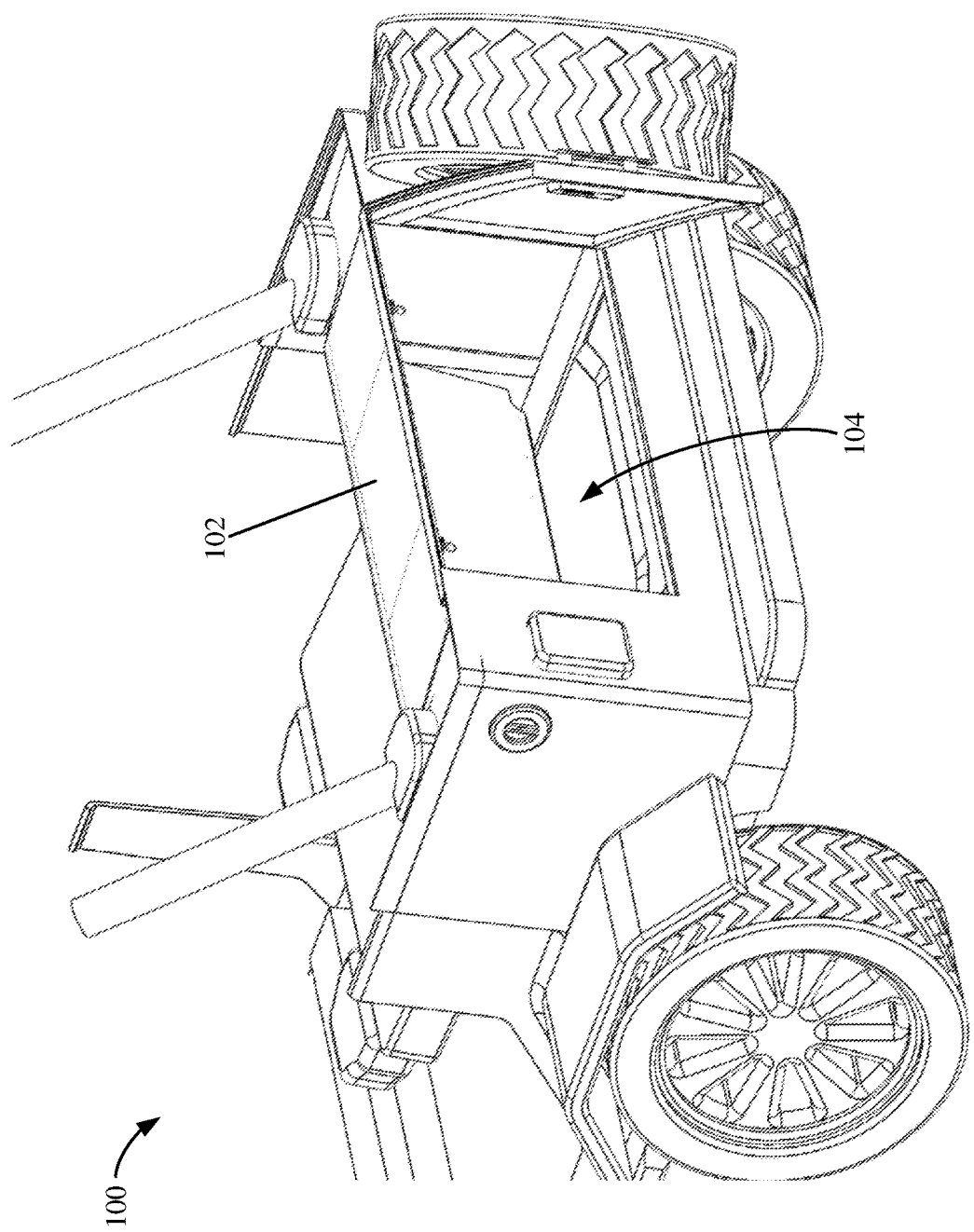
FIG. 1 is an isometric view of a rear of a vehicle with a security device in a secured position according to at least one embodiment of the present disclosure.

Aspects of the present disclosure relate to devices that facilitate securing items in an area of a vehicle. In at least some embodiments, such devices can secure a back or trunk area of a jeep or other similarly configured vehicle. FIG. 1 shows a partial view of a vehicle 100 according to one example. As depicted, a security device 102 is hingedly coupled to a portion of the vehicle 100. In the depicted example, the security device 102 is in a secured position. In the secured position, the security device 102 secures an area 104 within the vehicle 100 from persons outside the vehicle 100.

Figure 2:
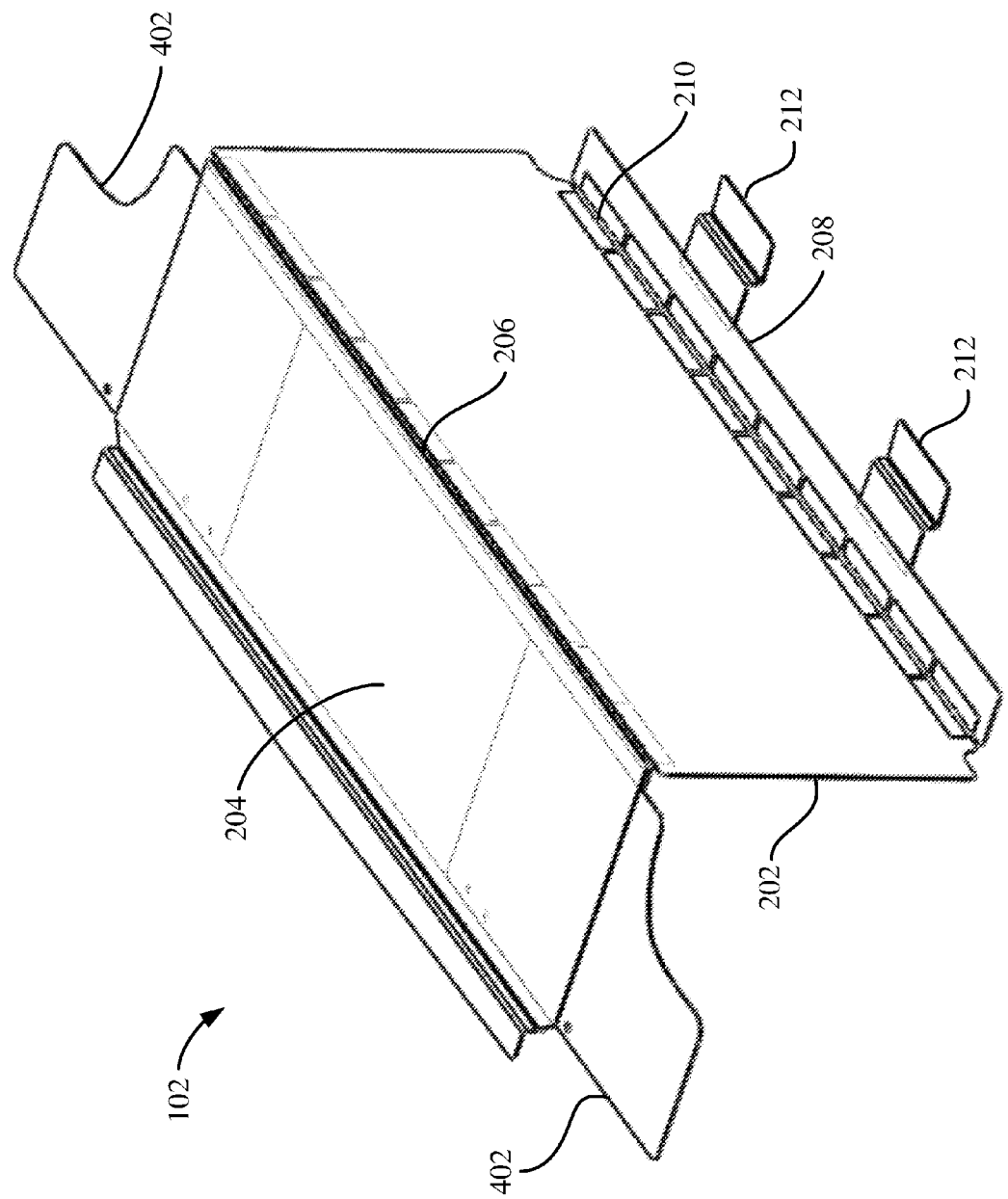
FIG. 2 is a top isometric view of a security device according to at least one example of the present disclosure.

FIG. 2 is a top isometric view of the security device 102 according to at least one example of the present disclosure. As shown, the security device 102 includes a side panel 202 and a top panel 204. The side panel 202 and the top panel 204 are movably coupled together along an adjoining edge 206. In at least one example, a hinge may be utilized to couple the side panel 202 and the top panel 204 together along the adjoining edge 206.

An attachment mechanism 208 may also be movably coupled to the side panel 202 along an adjoining edge 210. In at least one example, the attachment mechanism 208 can be movably coupled to the side panel 202 with one or more hinges along the adjoining edge 210. The attachment mechanism 208 may include one or more components 212 having a hook-like configuration, as depicted in FIG. 2. In some models of vehicles, such as some JEEP vehicles, a trunk space includes slots formed in the floor, as described in more detail below with reference to FIGS. 6 and 7. In other embodiments, hook-like components 212 can be configured to attach to a loop feature of the vehicle. In still other examples, the attachment mechanism 208 may be configured to fasten to a portion of the vehicle utilizing one or more fasteners, such as a bolt, a screw, adhesive, or other mechanism for coupling the attachment mechanism 208 to the vehicle.

Figure 3:
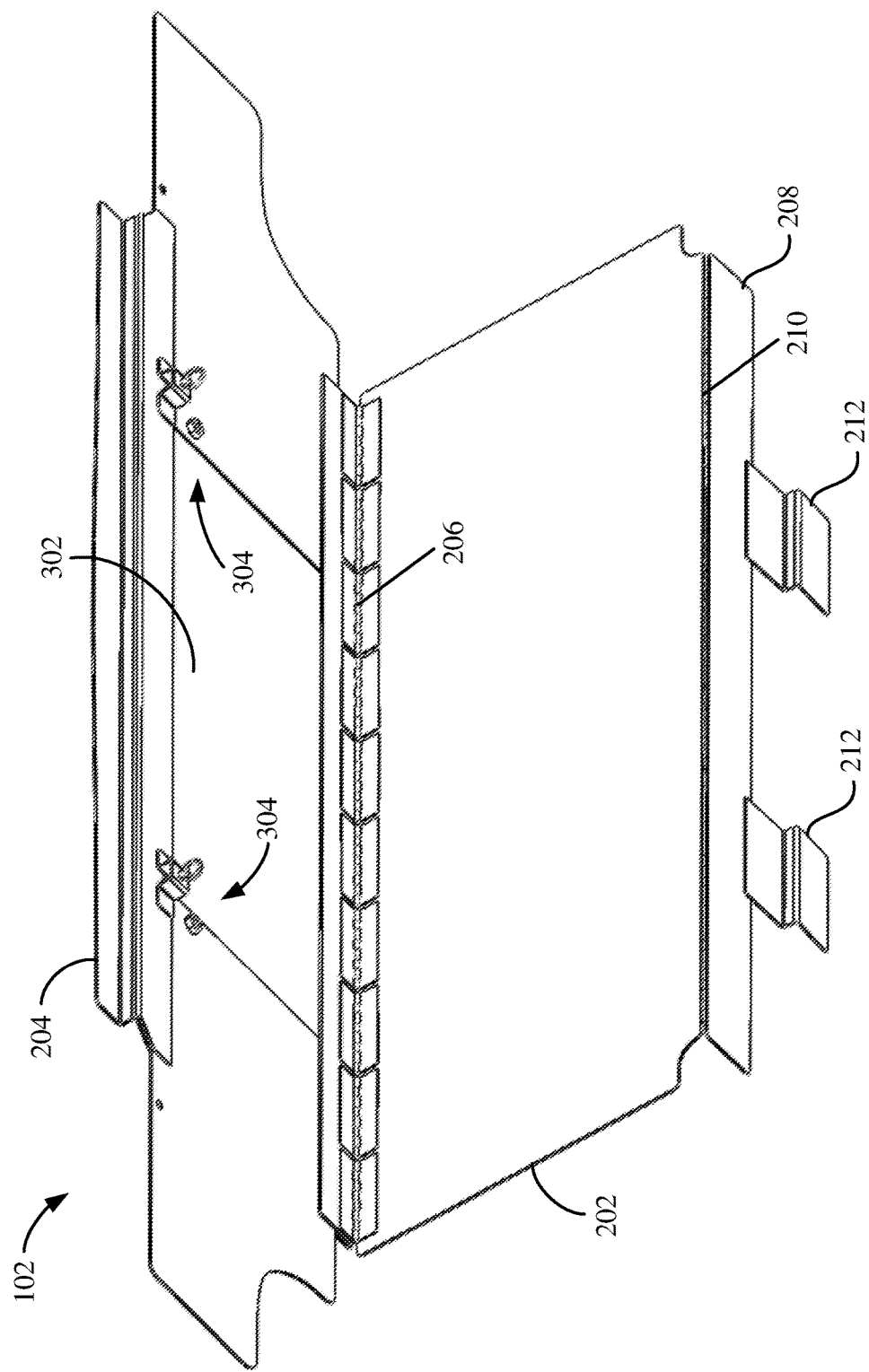
FIG. 3 is a bottom isometric view of the security device in FIG. 2 according to at least one example of the present disclosure.
Figure 4:
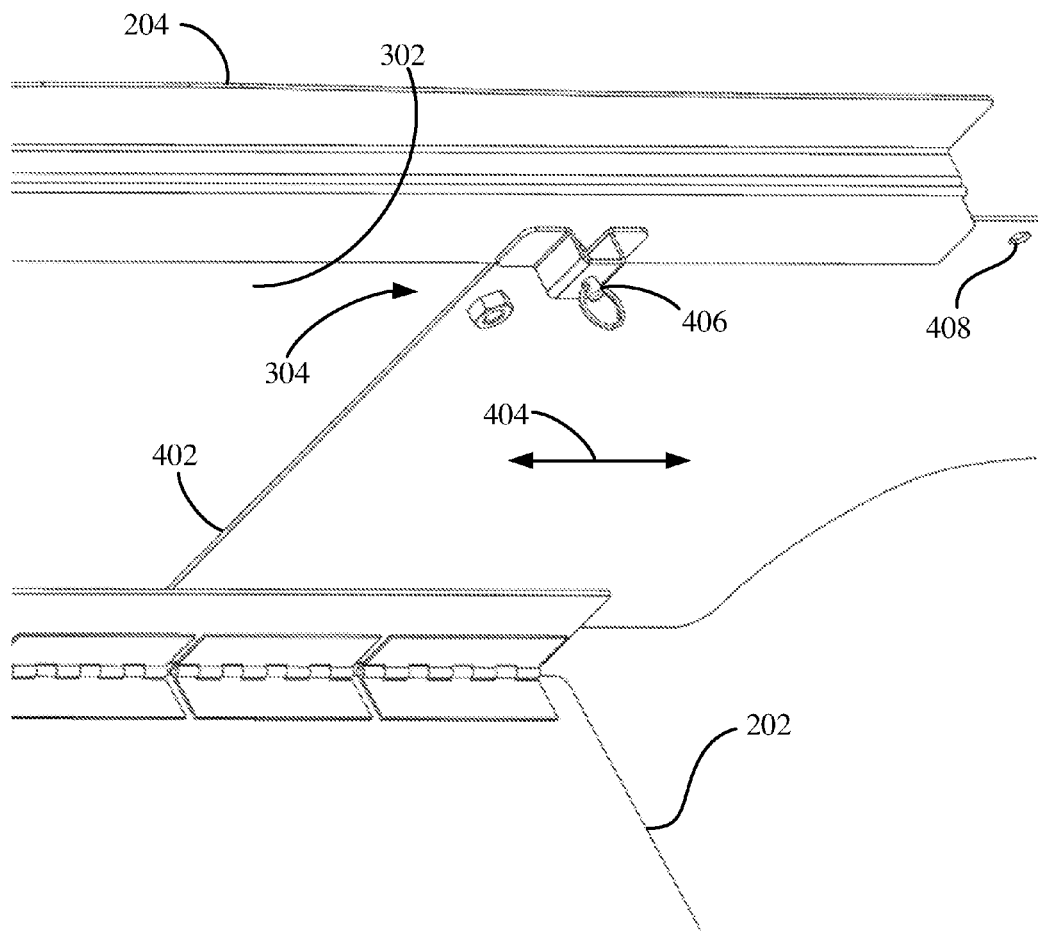
FIG. 4 is an isometric view of an embodiment of a locking assembly according to at least one example of the present disclosure.

Turning to FIG. 3, a bottom isometric view of the security device 102 is shown according to at least one example of the present disclosure. As illustrated, the top panel 204 includes a bottom surface 302 with at least one locking assembly 304 coupled thereto. In the depicted embodiment, the security device 102 includes two locking assemblies 304. FIG. 4 is a magnified view of the locking assembly 304 according to the example depicted in FIGS. 1 through 3. As shown, each locking assembly 304 includes an extension structure 402 movably coupled to the top panel 204 so that the extension structure 402 can be adjusted laterally outward and inward with respect to the top panel 204 in the direction of arrow 404.

The locking assembly 304 can further include a locking mechanism. In the embodiment depicted in FIG. 4, the locking mechanism includes a lock pin 406 configured to be positioned within an aperture, such as aperture 408 formed in the locking panel configuration of the extension structure 402. In this example, the aperture 408 may be utilized to lock the locking panel in a laterally inward position relative to the top panel 204. Similarly, another aperture (not shown) may be included in the locking panel to lock the locking panel in a laterally outward position. In other embodiments, the locking mechanism may be operated by a key accessible from a top surface of the top panel 204.

Figure 5:
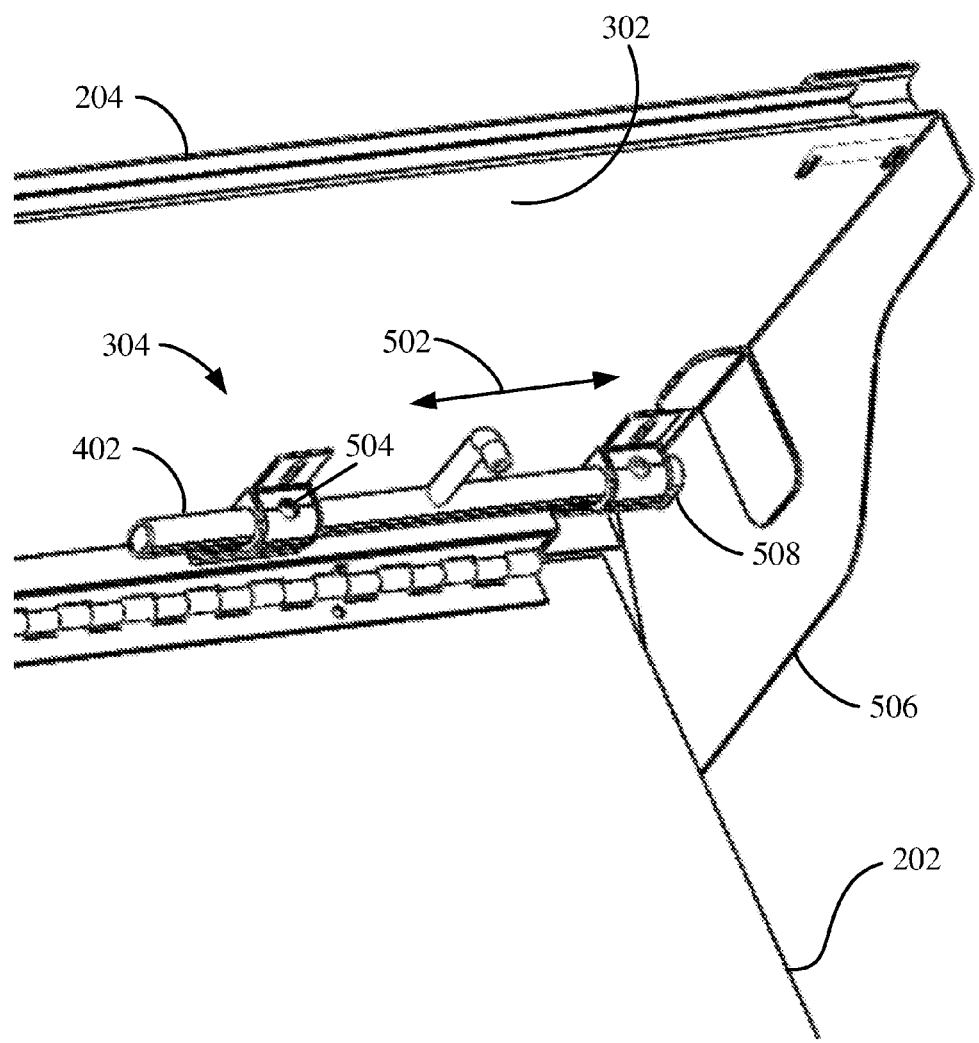
FIG. 5 is an isometric view of at least one other embodiment of a locking assembly according to one or more examples of the present disclosure.

Although the extension structure 402 is configured in FIG. 3 as a locking panel slidably coupled to the bottom surface 302 of the top panel 204, other embodiments may employ different structure that is coupled to the top panel 204 so as to be able to move or adjust between a laterally outward position and a laterally inward position. For example, FIG. 5 is a close view of another embodiment of a locking assembly 304. As shown, the locking assembly 304 includes an extension structure 402 configured as a rod movably coupled to the top panel 204 so that the extension structure 402 can be adjusted lateral outward and inward with respect to the top panel 204 in the direction of arrow 502. A locking mechanism may include an aperture 504 through which a lock pin (not shown) can be positioned when the extension structure 402 is fully displaced laterally outward. As noted above, other embodiments may employ a locking mechanism that is configured to be operated by a key accessible from a top surface of the top panel 204.

In the embodiment in FIG. 5, lateral panels 506 are coupled to the top panel 204 at opposing longitudinal ends of the top panel 204 to extend at least substantially perpendicular to the top panel 204, while extending at least substantially parallel to each other. The lateral panels 506 can include an aperture 508 aligned with an extension structure 402 so that the extension structure 402 can be moved through the aperture 508 when the extension structure is adjusted laterally outward and inward.

Alternative embodiments of extension structures 402 may also be used. For example, instead of utilizing a slidable locking panel, the locking panels in FIGS. 3 and 4 may be hingedly coupled along an adjoining edge to the top panel 204 to fold laterally outward and inward. Further, one or more embodiments of an extension structure 402 may be coupled to a different surface (e.g., the top surface) or to an edge of the top panel 204 in one or more other examples. In still further embodiments, an extension structure 402 may be coupled to the vehicle instead of the top panel 204, and configured to move laterally inward or outward relative to the top panel 204 to perform similar functions as the extension structures 402 described above.

Figure 6:
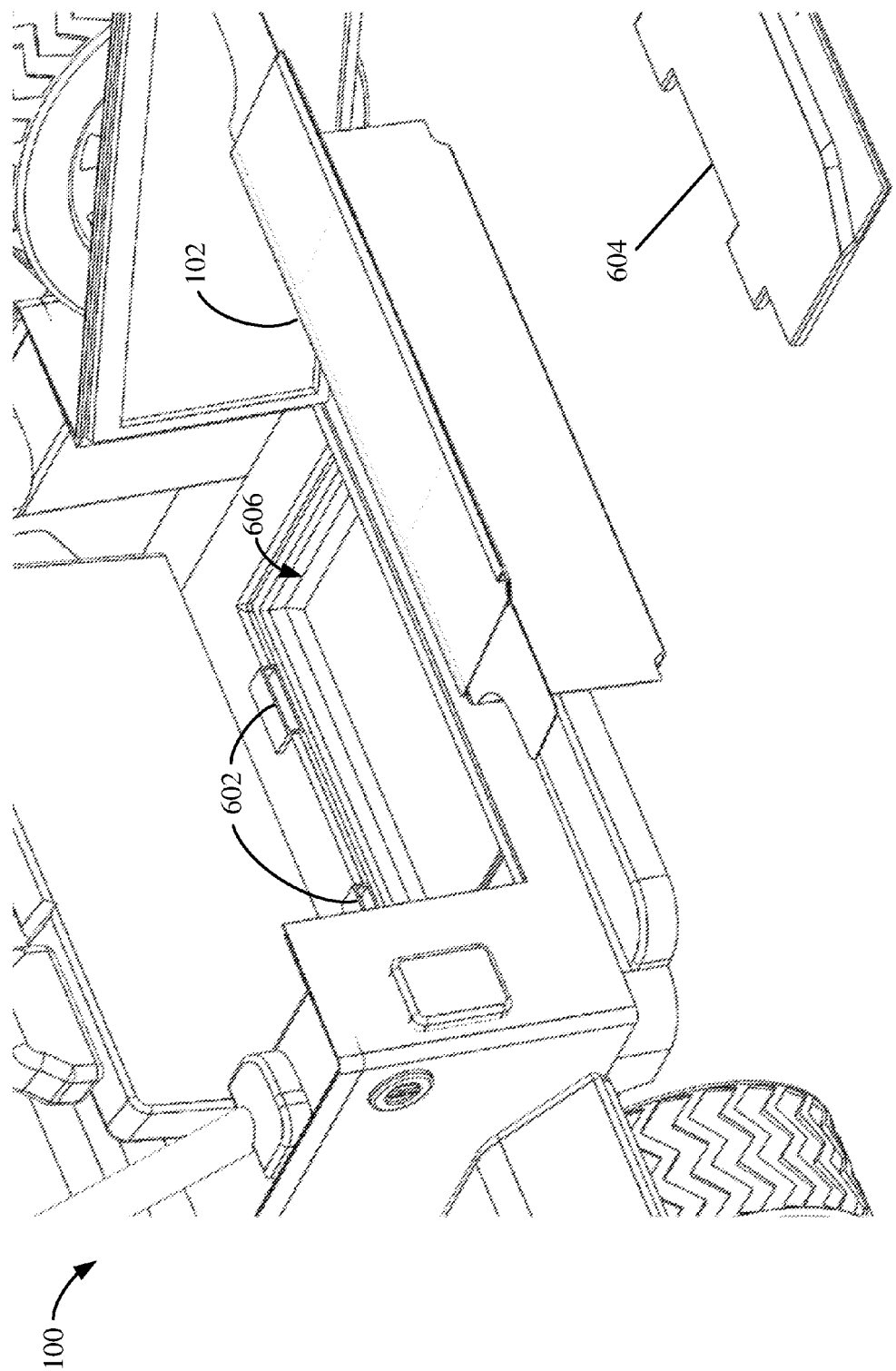
FIG. 6 is an isometric view of a rear of a vehicle illustrating one or more aspects of installation and removal of a security device according to at least one example of the present disclosure.

As noted above with reference to FIG. 2, the attachment mechanism 208 may include one or more components 212 having a hook-like configuration. Referring now to FIG. 6, a partial view of the vehicle 100 is shown illustrating how the hook-like components 212 (not visible in FIG. 6) can be coupled to the vehicle 100 according to one example. In some models of vehicles, such as some JEEP vehicles, a trunk space includes slots 602 formed in the floor. The slots 602 may be associated with a cover 604 included with the vehicle that can be secured over an area 606.

Figure 7:
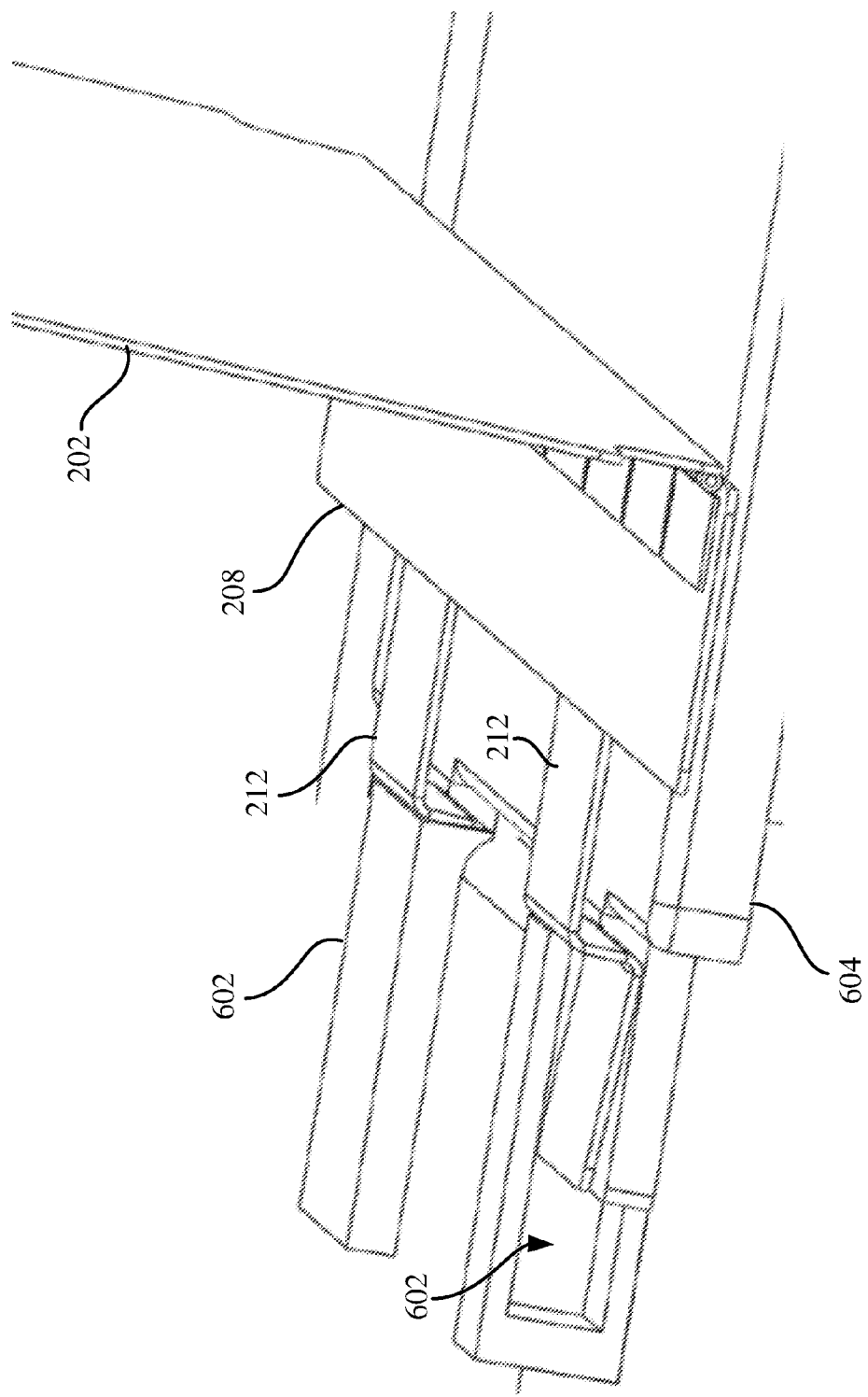
FIG. 7 is a partially sectioned isometric view of a portion of a side of a vehicle illustrating the positioning of an attachment mechanism in slots of a vehicle according to at least one example of the present disclosure.

Referring now to FIG. 7, the attachment mechanism 208 with hook-like components 212 can be configured such that respective hook-like components 212 are sized, shaped, and located to fit into the slots 602. As shown, the hook-like components 212 are at least partially inserted into a respective slot 602. Further, portions of the cover 604 can also be at least partially inserted into respective slots 602, which can further retain the attachment mechanism 208 into place. In this manner, the security device 102 can be relatively easily installed and removed by a user. In embodiments employing components 212 having a hook-like configuration, the security device 102 can be readily installed and removed from the vehicle by inserting the hook-like components 212 into a relative slot to install the security device 102, and sliding the hook-like components 212 out of the slots to remove the security device 102.

Figure 8:
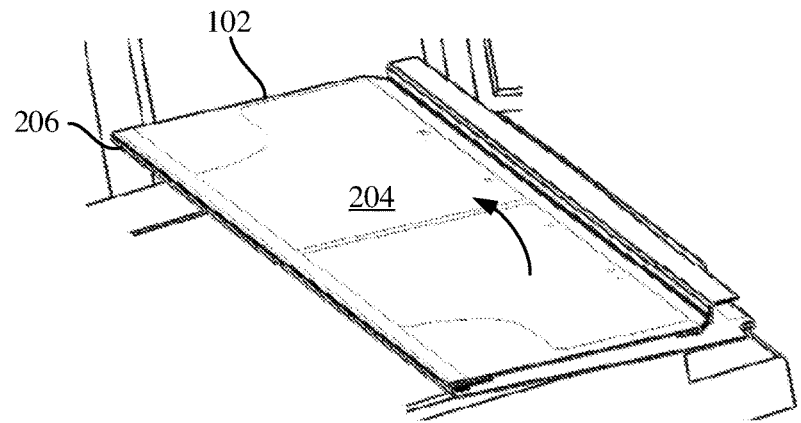
FIG. 8 is a partially sectioned isometric view of a rear of a vehicle with a security device in a storage position according to at least one embodiment of the present disclosure.
Figure 13:
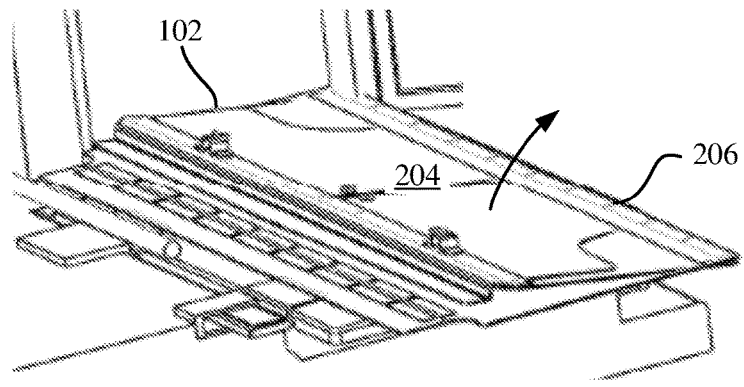
FIG. 13 is a partially sectioned isometric view of a rear of a vehicle with a security device in a storage position according to at least one embodiment of the present disclosure.

In operation, the security device 102 of the present disclosure can operate in both a secured position and in a storage position, and can be transitioned between the two positions. FIG. 1 illustrates the security device 102 in the secured position, and FIGS. 8 and 13 illustrate different configurations of the security device 102 in the storage position. The security device 102 can be folded down in the storage position, such that the side panel 202 is positioned at least substantially parallel to the top panel 204 and to the floor surface of the vehicle. In other words, the side panel 202, the top panel 204, and the floor surface of the vehicle are parallel or relatively near parallel (e.g., with a relatively small angles between the side panel 202, the top panel 204, and the floor surface) with the side panel 202 and top panel 204 adjacent each other when folded together in the storage position. Additionally, the extension structures 402 can be positioned laterally inward so that they are not engaging any part of the vehicle interior, enabling the top panel 204 to hinge to the one of the positions shown in FIGS. 8 and 13. In this way, the security device 102 is positioned out of the way, such as to enable access to the trunk space from outside the vehicle 100 or to facilitate storage of items that may be relatively tall and would not fit in the trunk space with the security device 102 in the secured position.

Figure 9:
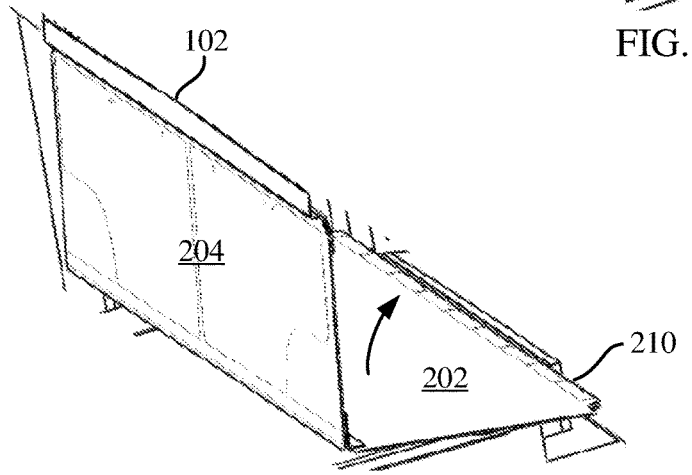
FIG. 9 is a partially sectioned isometric view of a rear of a vehicle depicting the conversion of the security device from a storage position to a secured position according to at least one embodiment of the present disclosure.
Figure 10:
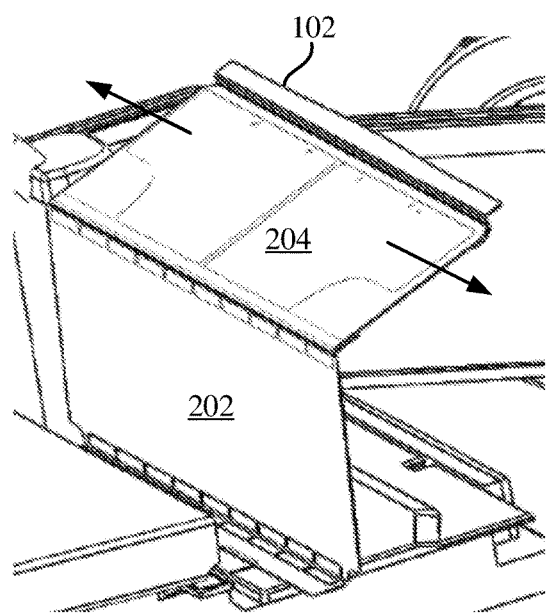
FIG. 10 is a partially sectioned isometric view of a rear of a vehicle depicting the conversion of the security device from a storage position to a secured position according to at least one embodiment of the present disclosure.

Referring now to FIGS. 8, 9, and 10, an example process for transitioning the security device 102 from the storage position to the secured position is depicted. As shown in FIG. 8, the top panel 204 can be folded forward toward the front of the vehicle, rotating about the edge 206 adjoining the top panel 204 with the side panel 202 to a position similar to that shown in FIG. 9. When the top panel 204 is positioned similar to the orientation shown in FIG. 9, the top panel 204 and the side panel 202 can be folded backward toward the rear of the vehicle, rotating about the edge 210 adjoining the top panel 204 with the attachment mechanism 208, as depicted in FIG. 9, resulting in an orientation similar to that shown in FIG. 10. As shown in FIG. 10, the extension structures 402 are still positioned laterally inward. Accordingly, the extension structures 402 can be moved laterally outward relative to the top panel 204, as depicted in FIG. 10, resulting in an orientation similar to that shown in FIG. 11.

Figure 11:
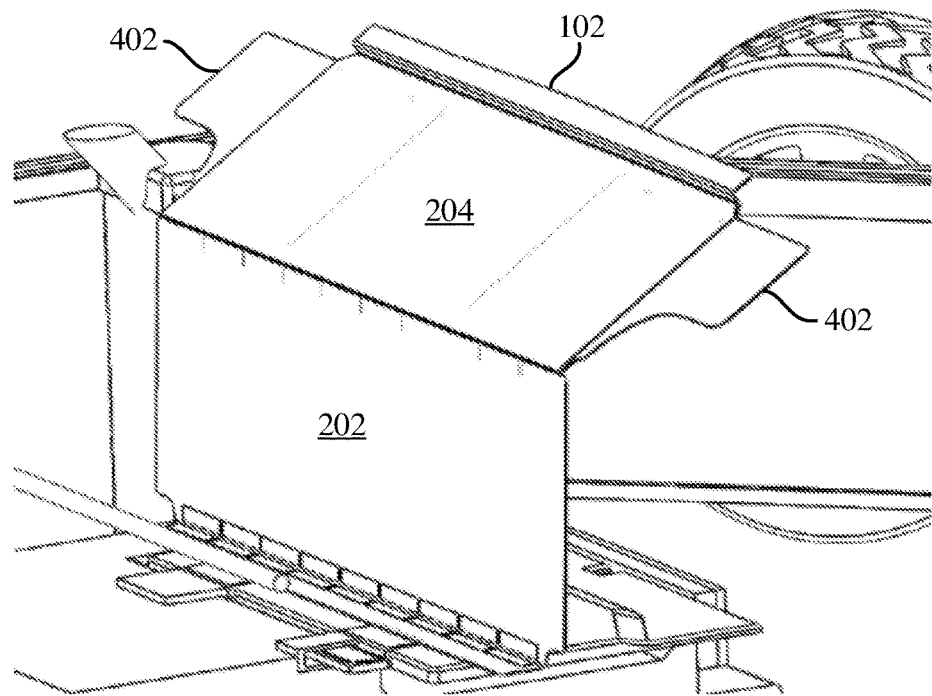
FIG. 11 is a partially sectioned isometric view of a rear of a vehicle depicting the conversion of the security device from a storage position to a secured position according to at least one embodiment of the present disclosure.
Figure 12:
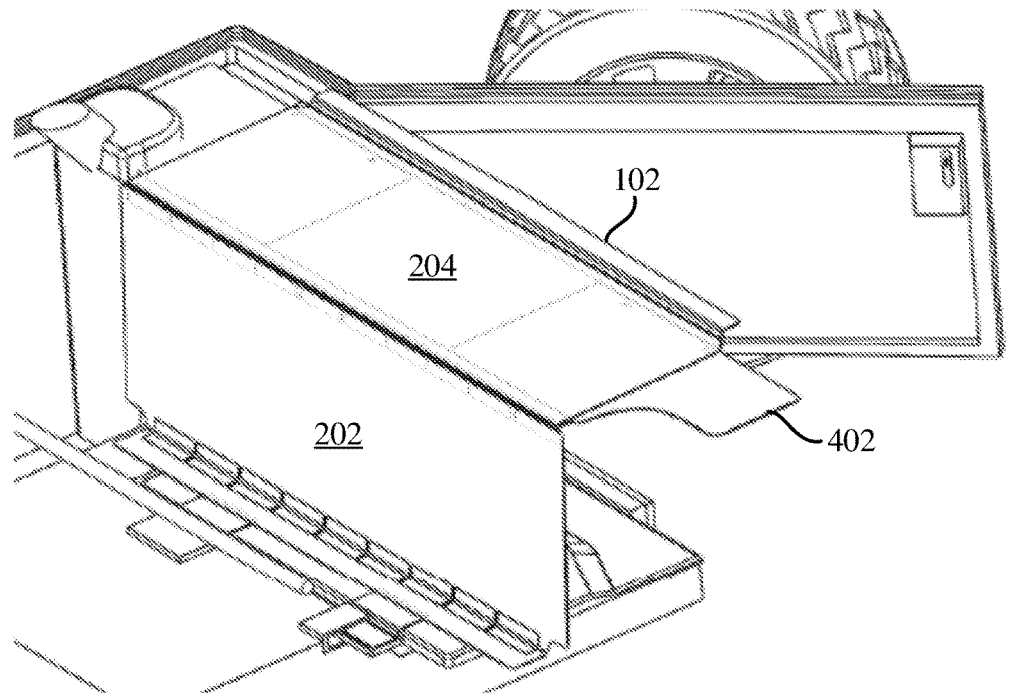
FIG. 12 is a partially sectioned isometric view of a rear of a vehicle depicting the conversion of the security device from a storage position to a secured position according to at least one embodiment of the present disclosure.

Referring to FIG. 11, with the extension structures 402 extended laterally outward relative to the top panel 204, the top panel 204 can be secured into position to at least substantially cover the area 106 with the security device 102 in the secured position. In the secured position, the side panel 202 is positioned at least substantially transverse to the top panel 204 and to the floor surface of the vehicle as shown in FIG. 12, and the extension structures 402 are positioned laterally outward from the top panel 204 against a portion of the vehicle. As shown in FIG. 1, the top panel 204 can at least substantially cover the area 104 with the security device 102 in the secured position.

Figure 14:
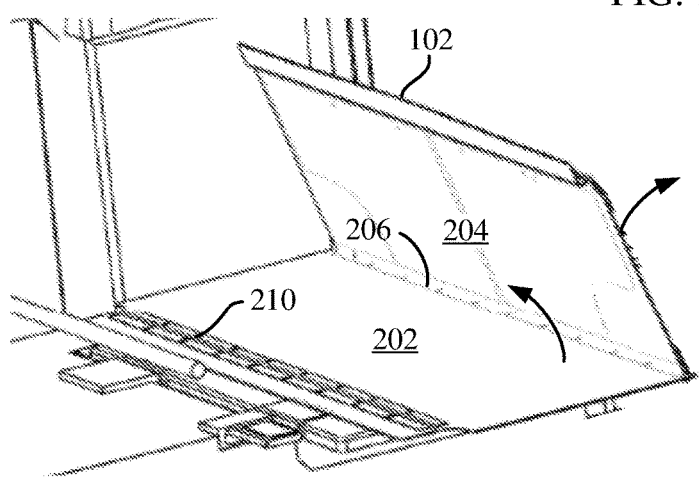
FIG. 14 is a partially sectioned isometric view of a rear of a vehicle depicting the conversion of the security device from a storage position to a secured position according to at least one embodiment of the present disclosure.
Figure 15:
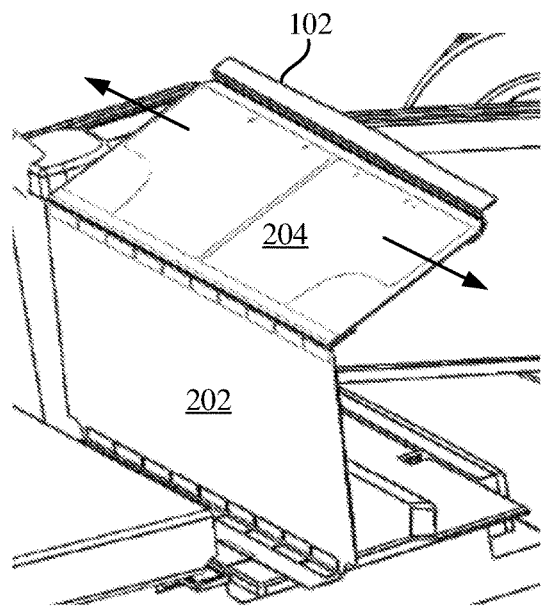
FIG. 15 is a partially sectioned isometric view of a rear of a vehicle depicting the conversion of the security device from a storage position to a secured position according to at least one embodiment of the present disclosure.

Referring now to FIGS. 13, 14, and 15, another example process for transitioning the security device 102 from the storage position to the secured position is depicted. In this example, the side panel 202 and the top panel 204 are folded differently from the example in FIGS. 8, 9, and 10. As shown in FIG. 13, the top panel 204 can be folded backward toward the rear of the vehicle, rotating about the edge 206 adjoining the top panel 204 with the side panel 202 to an orientation similar to that shown in FIG. 14. At the orientation shown in FIG. 14, the top panel 204 can continue to be folded rearward about the edge 206 toward the back of the vehicle, while the side panel 202 can be folded forward toward the front of the vehicle about the edge 210 adjoining the top panel 204 with the attachment mechanism 208, as depicted in FIG. 14, until the security device 102 is oriented similar to the orientation shown in FIG. 15. As shown in FIG. 15, the extension structures 402 are still positioned laterally inward. Accordingly, the extension structures 402 can be moved laterally outward relative to the top panel 204, as depicted in FIG. 15, resulting in an orientation similar to that shown in FIG. 11.

As noted above, from the orientation shown in FIG. 11 with the extension structures 402 extended laterally outward relative to the top panel 204, the top panel 204 can be secured into position to at least substantially cover the area 106 with the security device 102 in the secured position. In the secured position, the side panel 202 is positioned at least substantially transverse to the top panel 204 and to the floor surface of the vehicle as shown in FIG. 12, and the extension structures 402 are positioned laterally outward from the top panel 204 against a portion of the vehicle. As shown in FIG. 1, the top panel 204 can at least substantially cover the area 104 with the security device 102 in the secured position.

When the security device 102 is in the secured position, the top panel 204 is maintained in position by the extension structures 402 being adjacent the interior of the vehicle 100, and the top panel 204 cannot be folded without reversing the operations described above for unfolding the security device 102 from the storage position to the secured position. In order to block the ability to reverse the operations described above for unfolding the security device 102 from the storage position to the secured position, the locking assembly 304 can be employed. For example, the extension structures 402 can be adjusted laterally outward and against a portion of the vehicle 100, as shown in FIG. 1. In the depicted examples, the extension structures 402 are configured as locking panels that partially wrap around portions of the interior and sit on top of other portions of the interior. In other embodiments, the extension structures 402 can be configured as the rod in FIG. 5 that can be displaced laterally outward into an aperture in a roll bar or some other portion of the vehicle 100.

The extension structures 402 can be locked into the laterally outward position to inhibit a person from adjusting an extension structure 402 laterally inward by the locking mechanism described previously. With the extension structures 402 locked into the laterally outward extension position, the top panel 204 cannot be folded down to the storage position.

Figure 16:
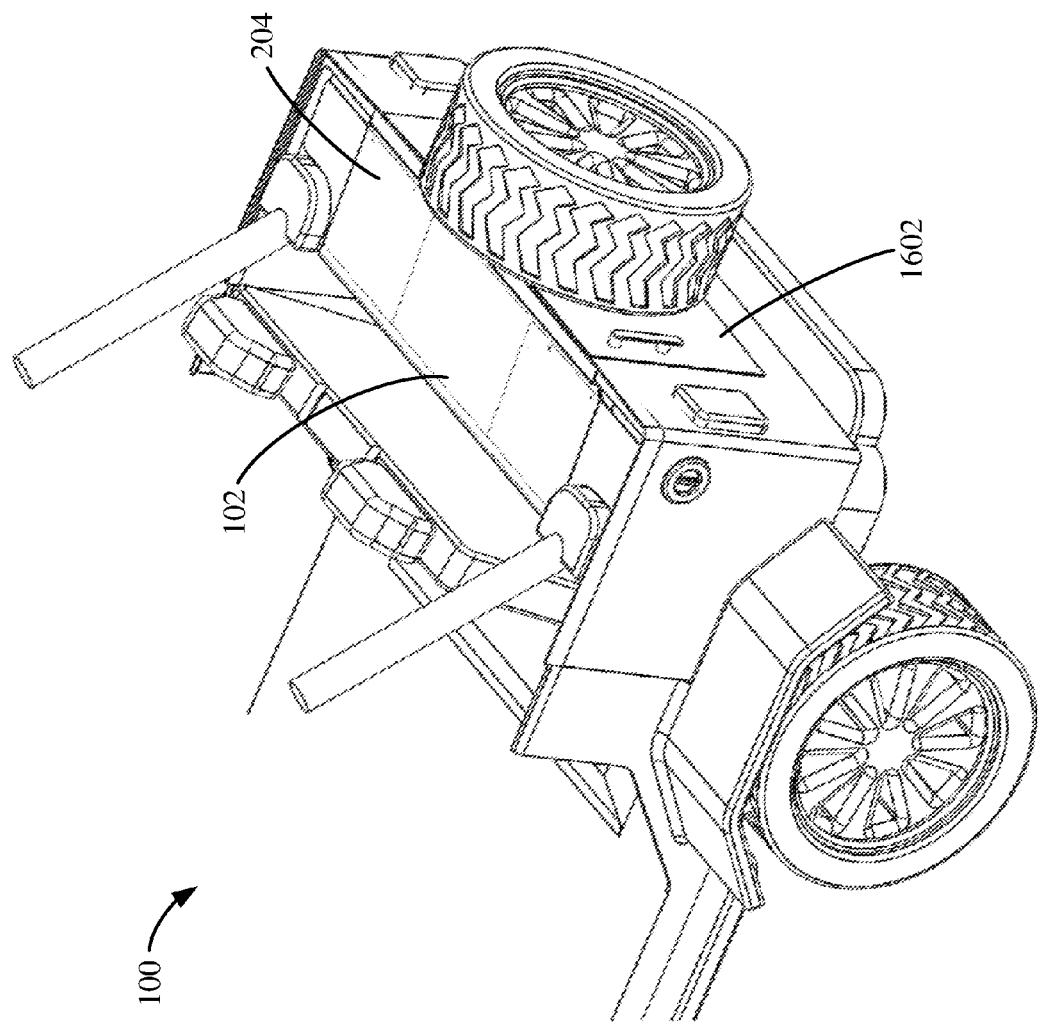
FIG. 16 is an isometric view of a rear of a vehicle with a security device in a secured position when a rear door is closed.

To finish enclosing the area 104 of the vehicle 100, a rear door 1602 can be closed, as shown in FIG. 16. The rear door 1602 can also help retain the top panel 204 from rotating upward when the rear door 1602 is closed. For example, the top panel 204 can extend partially under an edge of the rear door 1602 that inhibits the top panel 204 from rotating upward with the rear door 1602 closed. Additionally, the locking panel extension structures 402 can be configured to cover any small opening that could be accessible if they were not present.

Employing one or more embodiments of the present disclosure, a user can secure items within the area 104 of the vehicle 100 from persons outside of the vehicle. Because the extension structures 402 are locked into the laterally outward position, only the user with a key to either the rear door 1602 and/or the locking mechanism will be able to release the locking mechanism, adjust the extension structures 402 laterally inward and subsequently adjust the security device 102 to the storage position.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A security device for securing an area within a vehicle, comprising:
    an attachment mechanism sized and shaped to be coupled to a portion of a vehicle;
    a side panel movably coupled to the attachment mechanism along a first adjoining edge of the side panel;
    a top panel movably coupled to the side panel along a second adjoining edge of the side panel; and
    at least one extension structure configured to be adjusted laterally inward and outward relative to the top panel; and
    a locking mechanism positioned to lock the at least one extension structure from being laterally adjusted when the at least one extension structure is in a laterally outward position.

2. The security device of claim 1, wherein the attachment mechanism comprises a first hook and a second hook, each configured to fit into a respective slot in a floor of a vehicle.

3. The security device of claim 1, wherein the attachment mechanism comprises a first hook and a second hook each configured to attach to a respective loop feature of a vehicle.

4. The security device of claim 1, wherein the side panel is movably coupled to the attachment mechanism by a hinge positioned along the first adjoining edge.

5. The security device of claim 1, wherein the top panel is movably coupled to the side panel by a hinge positioned along the second adjoining edge.

6. The security device of claim 1, wherein:
    the side panel is positioned at least substantially transverse to the top panel in a secured position; and
    the side panel is positioned at least substantially parallel to the top panel in a storage position.

7. The security device of claim 1, wherein the locking mechanism is positioned on one of a top surface of the top panel or a bottom surface of the top panel.

8. A vehicle, comprising:
    a trunk space with a floor surface;
    a side panel positioned within the trunk space and hingedly coupled to a portion of the trunk space;
    a top panel hingedly coupled to the side panel;
    at least one extension structure configured to be adjusted laterally inward and outward relative to the top panel; and
    wherein the side panel is positioned at least substantially transverse to the top panel and to the floor surface in a secured position, and the side panel is positioned at least substantially parallel to the top panel and to the floor surface in a storage position.

9. The vehicle of claim 8, wherein the side panel hingedly coupled to a portion of the trunk space comprises a side panel hingedly coupled to an attachment mechanism comprising a first hook and a second hook, each fitted into a respective slot in the floor surface of the trunk space.

10. The vehicle of claim 8, wherein the side panel hingedly coupled to a portion of the trunk space comprises a side panel hingedly coupled to an attachment mechanism fastened to the floor surface of the trunk space by at least one fastener.

11. The vehicle of claim 8, wherein the at least one extension structure comprises a locking panel.

12. The vehicle of claim 11, wherein the locking panel is one of slidably coupled to the top panel or hingedly coupled to the top panel along an adjoining edge.

13. The vehicle of claim 8, further comprising a locking mechanism positioned to lock the at least one extension structure from being adjusted laterally inward after the at least one extension structure is adjusted laterally outward.

14. The vehicle of claim 8, wherein the at least one extension structure is movably coupled to one of a bottom surface of the top panel or a top surface of the top panel.

15. The vehicle of claim 8, wherein the at least one extension structure extends laterally outward from the top panel in the secured position, and is located adjacent to a portion of the vehicle to inhibit movement of the top panel toward a front side of the vehicle.

16. A security device for securing an area within a vehicle, comprising:
    a top panel;
    a first extension structure movably coupled to the top panel to be adjusted laterally inward and outward relative to the top panel;
    a second extension structure movably coupled to the top panel to be adjusted laterally inward and outward relative to the top panel;
    a side panel hingedly coupled to the top panel;
    an attachment mechanism hingedly coupled to the side panel, the attachment mechanism configured to be coupled to a portion of a vehicle;
    wherein the side panel is positioned at least substantially transverse to the top panel, and the first extension structure and the second extension structure each extend laterally outward from the top panel in a secured position; and
    wherein the side panel is positioned at least substantially parallel to the top panel, and the first extension structure and the second extension structure each are positioned laterally inward relative to the top panel and adjacent the top panel in a storage position.

17. The security device of claim 16, wherein:
the first extension structure is configured as a first locking panel; and
the second extension structure is configured as a second locking panel.

18. The security device of claim 17, wherein:
the first locking panel is one of slidably coupled to the top panel or hingedly coupled to the top panel along an adjoining edge; and
the second locking panel is one of slidably coupled to the top panel or hingedly coupled to the top panel along an adjoining edge.

19. The security device of claim 16, further comprising:
a first locking mechanism positioned to lock the first extension structure from being adjusted laterally inward after the first extension structure is adjusted laterally outward; and
a second locking mechanism positioned to lock the second extension structure from being adjusted laterally inward after the second extension structure is adjusted laterally outward.

* * * * *